Nov. 24, 1925.　　　　　　　　　　　　　　　　　1,563,013
H. E. BRUNNER
LOOSE PULLEY
Filed Feb. 27, 1923
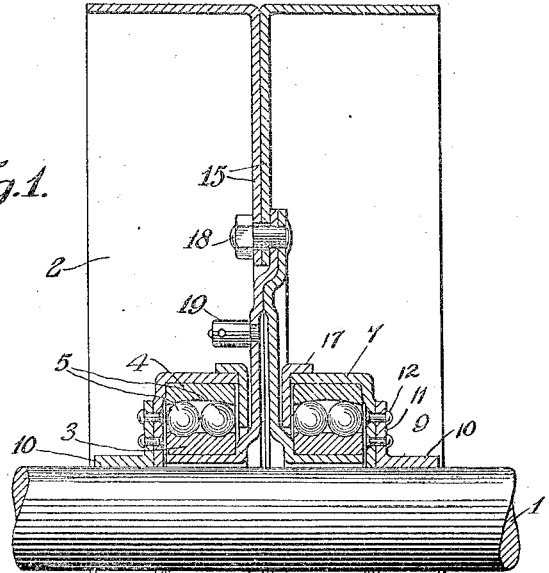
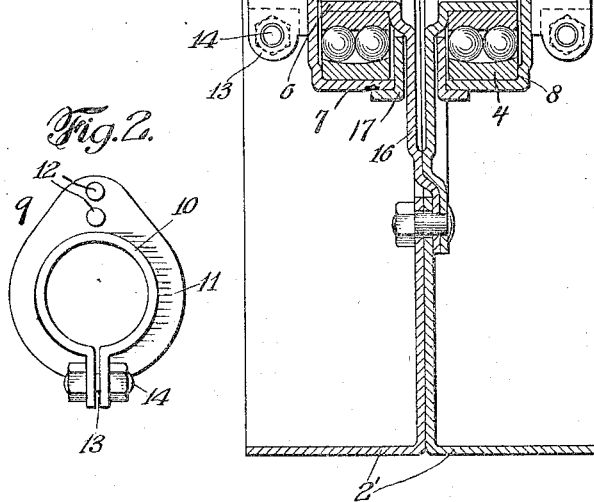
Inventor
Harold E. Brunner.
By his Attorneys
Rogers, Kennedy & Campbell Patented Nov. 24, 1925.

1,563,013

UNITED STATES PATENT OFFICE.

HAROLD E. BRUNNER, OF LARCHMONT, NEW YORK.

LOOSE PULLEY.

Application filed February 27, 1923. Serial No. 621,510.

*To all whom it may concern:*

Be it known that I, HAROLD E. BRUNNER, a citizen of the United States, residing at Larchmont, in the county of Westchester and State of New York, have invented certain new and useful Improvements in Loose Pulleys, of which the following is a specification, reference being had therein to the accompanying drawing.

This invention relates to the mountings for loose pulleys and has for an object to provide a strong and efficient anti-friction bearing connection, of the ball or roller type, between the rotary shaft and the belt carrying portion or drum of the pulley. A further object of the invention is to furnish such means of mounting whereby the inner ring of the bearing rotates and the outer ring stands still when the driving belt is shipped onto the loose pulley.

In the drawings accompanying this application one practicable embodiment of the invention is illustrated wherein the pulley is shown mounted, by way of illustration, upon a pair of two-row self-aligning ball bearings. In which drawings:

Figure 1 is a central longitudinal section of the device, and Figure 2 shows one of the clamping members removed.

For the purpose of this description it will be assumed that the shaft, 1, is a countershaft or a machine driving shaft, which shaft is rotated when the driving belt is on the fixed pulley, not shown, and remains idle or substantially still when the belt is shipped to the flange or drum, 2, of the loose pulley. The invention largely centers around the mounting of the anti-friction bearings which, in the form herein illustrated, comprise the inner and outer rings, 3 and 4, respectively, between which are mounted rolling elements, 5, in the present instance shown as balls. The specific type of bearing herein illustrated is a two row self-aligning bearing which form, while not essential to the invention, nevertheless, has proved efficient in loose pulley construction.

It is a well known fact that ball bearings last much longer when their mounting is such that the inner race rotates and the outer race remains stationary, than when the reverse condition exists. To bring about this desirable condition according to the present preferred form of my invention, the web of the pulley is extended to form a pair of sleeve like members, 6, constituting as it were the hub proper of the pulley, and upon each of these sleeves is mounted one of the inner ball bearing rings, 3. Each of the outer rings, 4, is shown mounted in a housing fast with the shaft, 1. These housings are cup-like members, each having a flange, 7, for embracing the outer perimeter of the outer ring, 4, and a flat or radially disposed bottom portion, 8, which in the present instance is shown riveted to a clamping bracket, 9, which securely clamps the shaft and holds the parts in position. Before proceeding further particular attention will be directed to the clamping structure. It is shown comprising a split sleeve, 10, for embracing the shaft and a radially disposed portion, 11, adapted to be secured to the bottom portion 8 of the cup member, 7. The portion, 11, is held quite rigidly to the cup member in the present illustration by a pair of rivets, 12, which are disposed substantially diametrically opposite the split, 13. The extending sides of the flange, 10, which are bent over to accommodate the clamping bolt, 14, are thus free to yield to the pressure of this bolt and hold the parts securely in position. The parts 8 and 11 when integrally joined form a structure presenting the characteristics of a solid body split or slotted at the meeting plane of these parts beyond the region affected by the rivets. This construction affords a clamp which in the operation of tightening is flexible, but when fully tightened presents sufficient rigidity to hold the parts in place.

The belt receiving portion, 2, of the pulley is made up of two cup shaped members having flanges, 2' 2', the web being formed of the bottoms, 15, of these cup shaped members set bottom to bottom and clamped to web continuations, 16, which are bent at substantially right angles to form the sleeve portions, 6, of the hub heretofore described.

In assemblying the device the dust guards, 17, are first placed over the hub sleeves, the inner rings of the ball bearings placed over these sleeves, preferably with quite a tight fit, then the cup members, 7, to which have previously been riveted the clamping devices, are placed outside the outer rings of the bearings and in proper position in relation to the dust guards. The cup, 7, preferably has a tight fit with the outer rings of the ball bearings so that the entire structure independently of the shaft constitutes a self-contained handling unit.

Each side of this structure, when the webs, 16, are not secured by the bolts, 18, may by themselves constitute self-contained handling units apart from the drums or cups forming the belt receiving portion of the pulley, or they may be assembled with such pulley when desired.

The webs, 16, are shown spaced apart sufficiently to form a grease chamber which connects with the spaces between the rings of the ball bearings so that grease inserted at the connection, 19, finds its way to the balls and ball paths to keep these properly lubricated.

Although a single embodiment of the invention is illustrated, yet it will be apparent that changes in details of construction may be made within the terms of the claims without departing from the spirit of the invention.

I claim as my invention:

1. The combination with a pair of anti-friction bearings consisting of inner and outer rings and rolling elements therebetween, housings for the outer rings of such bearings and means for securing each of these to a shaft independently of the other, a pulley having a flange surrounding the anti-friction bearings and a hub connected with such flange upon which hub the inner rings of the bearings are mounted.

2. The combination with a shaft, of a pair of anti-friction bearings consisting of inner and outer rings and rolling elements therebetween, housings for the outer rings of such bearings and means for securing each of these to the shaft independently of the other, a pulley having a flange surrounding the anti-friction bearings and a hub connected with such flange upon which hub the inner rings of the bearings are mounted, the construction being such that when a live belt is on the pulley the said inner rings rotate and the outer rings stand still with the idle shaft.

3. A pulley comprising a web carrying outwardly directed flanges constituting the belt receiving portion of the pulley, the central portion of the web being formed with outwardly directed flanges constituting a hub, anti-friction bearings each constituting an inner ring and an outer ring and rolling elements therebetween, the inner rings of such bearings being mounted upon the said hub forming flanges, housings mounted upon the outer rings of the anti-friction bearings and clamping devices carried by such housings and adapted to clamp the same to the shaft.

4. An anti-friction bearing mounting, comprising a member adapted to surround a shaft and formed with a seat for an anti-friction bearing and a clamping sleeve split in a plane longitudinally of the shaft, and cleft from such member at the split side in a plane transversely of the shaft.

5. An anti-friction bearing mounting, comprising a cup shaped portion forming a housing for the outer bearing, and a clamp comprising a plate juxtaposed to the bottom portion of the cup member and a split sleeve carried thereby for embracing a shaft, the plate being integrally connected with the bottom portion of the cup member diametrically opposite the split in the sleeve and clamping members carried by the sleeve at the opposite sides of the split.

In testimony whereof, I have affixed my signature hereto.

HAROLD E. BRUNNER.